United States Patent [19]

Beneze

[11] 4,257,836
[45] Mar. 24, 1981

[54] PNEUMATIC TIRE

[75] Inventor: Heinz W. Benezé, Akron, Ohio

[73] Assignee: The Firestone Tire & Rubber Company, Akron, Ohio

[21] Appl. No.: 61,970

[22] Filed: Jul. 30, 1979

[51] Int. Cl.³ .................. B29H 17/00; B29H 17/28
[52] U.S. Cl. .................. 156/125; 152/330 R; 152/354 R; 152/361 R; 156/128 P; 156/128 N; 264/257; 264/259; 264/262; 264/275; 264/326
[58] Field of Search ........ 156/110 R, 110 CL, 123 R, 156/125, 128 P, 128 N; 152/330 R, 354 R, 357 R, 357 A, 361 R, 362 R; 264/501, 502, 257, 259, 260, 261, 262, 271, 275, 277, 315, 316, 326

[56] References Cited

U.S. PATENT DOCUMENTS

| | | | |
|---|---|---|---|
| 3,381,736 | 5/1968 | Ford et al. | 152/357 A |
| 3,701,374 | 10/1972 | McGillvary | 152/330 R |
| 3,837,986 | 9/1974 | Gorter et al. | 156/128 P |
| 4,049,767 | 9/1977 | Vaidya | 264/257 |
| 4,055,619 | 10/1977 | Goodfellow | 264/258 |
| 4,057,446 | 11/1977 | Goodfellow | 156/123 R |

FOREIGN PATENT DOCUMENTS 435133 10/1975 U.S.S.R. .................. 156/125

Primary Examiner—John E. Kittle

[57] ABSTRACT

This disclosure relates to a method of manufacturing a pneumatic tire having a cast body of viscoelastic material, a road-engaging tread surface and a girdle member of reinforcing cords located in the crown area of the cast body. The method comprises the steps of assembling an annular hoop assembly with the girdle member (having a predetermined radius of curvature, its reinforcing cords at the exact cord centerline diameter desired in the finished tire, and a predetermined tension on the cords) located on the inner periphery of the hoop assembly and a spacing support member located on the outer periphery of the hoop assembly; inverting or turning the hoop assembly inside out thereby locating the girdle member on the outer periphery (without changing its cord diameter, its radius of curvature and its cord tension) and the spacing support member on the inner periphery; mounting the inverted hoop assembly on the annular core of a tire mold so that the girdle member has its reinforcing cords at the exact cord centerline diameter desired; closing the tire mold; filling it with a viscoelastic material and curing the material. The method of this invention may be used to manufacture a tire with a tread of viscoelastic material or of conventional, carbon black reinforced, rubber. In the method of this invention wherein a conventional rubber tread is used, an additional step is necessary wherein the pre-cured conventional tread is placed in the tread section of the mold prior to the injection of the viscoelastic material.

10 Claims, 8 Drawing Figures

U.S. Patent  Mar. 24, 1981  Sheet 2 of 2  4,257,836
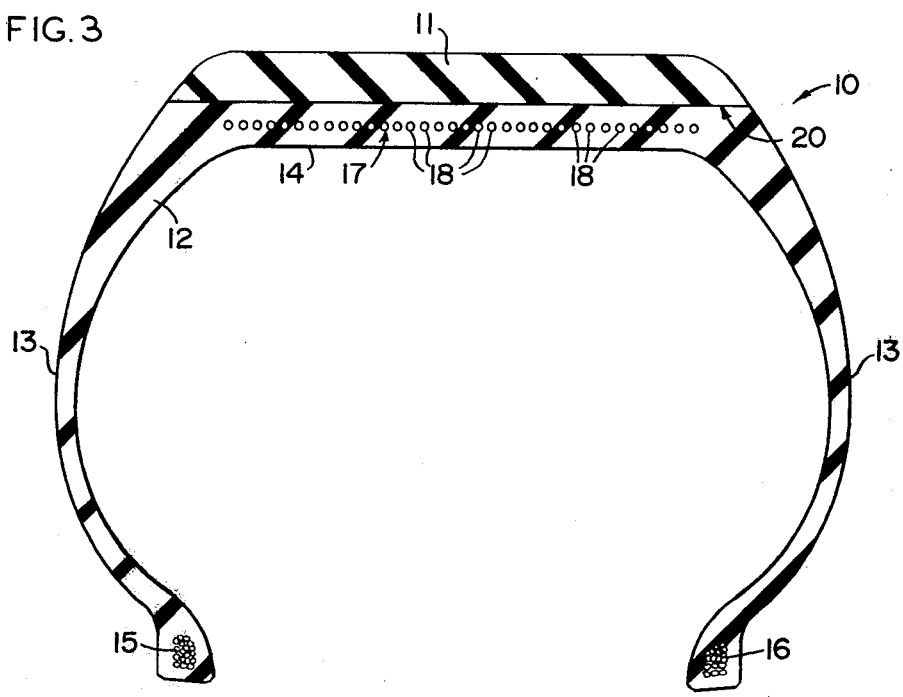
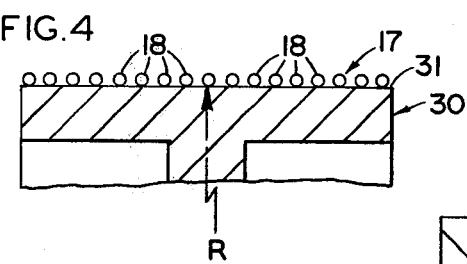
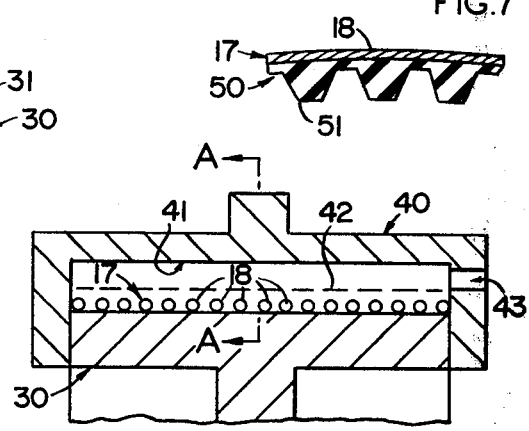
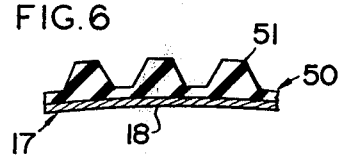
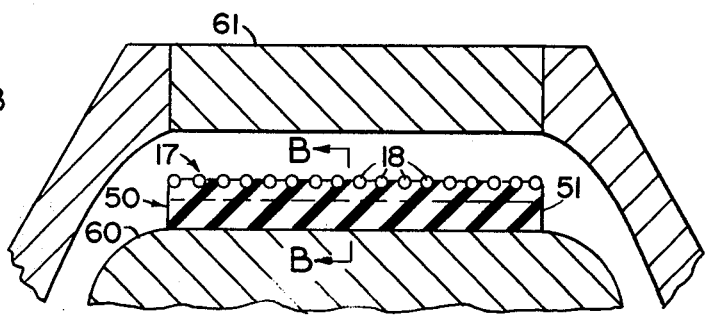

PNEUMATIC TIRE

BACKGROUND OF THE INVENTION

Cast tires comprised of a body without reinforcing cords which are made by a liquid casting, or injection molding, process using a viscoelastic material are known. Such tires with cast viscoelastic material treads or with conventional rubber treads are known. It is now believed that cast tires require a conventional rubber tread to have adequate traction and tread wear.

The dimensional stability of a cast body tire has long been known to be a major drawback. This feature manifests itself by the growth of the tire; that is, an increase in the overall diameter of the tire and/or the section width of the tire and a decrease in the tread radius of the tire upon inflation and use. Several constructions have been successful to control this growth. The most successful has been the incorporation of a girdle member in the crown area of the tire below the road-engaging tread surface.

This girdle member is comprised of parallel reinforcing cords that form a layer or a series of layers or plies. The reinforcing cords within each ply are parallel to one another. Where two or more plies are used, the cords from ply to ply may have various angulations or their angulation may be identical.

A major drawback to the use of a girdle member in the cast tire has been the lack of an accurate and reproducible method for locating the girdle member at the desired location in the tire. This is due to the fact that the girdle member must be located in the mold at a position that is surrounded by the flowable material during the casting operation.

The location of the girdle member in the cast tire is critical and must be closely controlled. If the girdle member is not properly located, proper dynamic balance and the dimensional stability of the tire may not be attained. The tire would therefore be unsatisfactory and would not give the performance characteristics that are required.

One attempt to locate such a member is set out in German Offenlegungsschrift No. 2,619,942. This disclosure provides a ply of inextensible, parallel wires with retaining brackets that have pins which extend radially outward from the parallel cords. The pins are set into a precured and prepositioned tread in the mold. The retaining brackets for the pins also are in contact with and supported by the mold at the lateral ends of the brackets. This technique has the drawbacks that the location of a precured tread in the mold and the dimensions of the precured tread itself are not accurate enough to ensure the accurate and reproducible location of the girdle member.

Prior methods of belt placement have not had the important capability of maintaining a selected tension on the cords in the belt member. The tension on the cords predetermines the forces in the cords. When the designed cord tensions are maintained a better performance and more uniform tire results. The method of this invention enables an accurate control of the tension on the girdle member cords all the way through the manufacturing process and into the final product. The method of this invention also enables uniform cord tension even when the girdle member has a designed radius.

The applicant has devised a new method of manufacturing a cast tire containing a girdle member that enables the accurate, reproducible placement of the girdle member at the designed location in the cast tire. The method also provides for the maintenance of a predetermined tension on the girdle member cord throughout the process and the capability of providing the girdle member with a radius.

It is an object of this invention to provide a method of manufacturing a cast tire wherein the dimensional stability is obtained by a girdle member located in the crown area of the tire. The method of this invention enables the accurate, reproducible location of this girdle member at the desired, predetermined optimum place in the tire, the maintenance of a preselected tension on the girdle member cords throughout the manufacturing process, and the presence of a radius in the girdle member, if desired.

SUMMARY OF THE INVENTION

This invention resides in a method of manufacturing a pneumatic tire with a cast body and a stabilizing girdle member located in the crown area of the cast body. The method enables the accurate, reproducible location of the girdle member in the tire. The location is at the designed cord centerline diameter for the cord members of the girdle member thereby attaining optimum results in the finished tire.

This method comprises the steps of assembling the girdle member on an annular member with the cord diameter of the reinforcing cords in the girdle member on the annular member being identical to the desired cord diameter in the finished tire. The annular member has sufficient rigidity to permit the application of a predetermined tension to the cords and the maintenance of this tension until the girdle member is assembled and fixed. The girdle member-annular member assembly is placed in a first mold that contains a means to form a spacing support member for the girdle member on the outer periphery of the girdle member. A viscoelastic material is injected into the first mold, either while the mold is at rest or spinning, around the girdle member to form the spacing support member on the radially outer side of the girdle member. After the viscoelastic material is cured to an extent which maintains its dimensional stability, the resulting hoop assembly which is comprised of the girdle member and the spacing support member is removed from the mold.

This hoop assembly is then inverted or turned inside out so that the girdle member is on the outer periphery of the inverted hoop and the spacing support member is on the inner periphery. The removal from the mold and inversion does not alter the tension on the girdle member cords. The dimension of the spacing support member is predetermined to reference it to the desired location of the girdle member in the finished tire in relation to the distance between this desired location and the annular, internal core of the final tire mold.

The inverted hoop assembly is then placed on the internal annular core of the tire mold with the spacing support member resting on the outer periphery of the core. This accurately and reproducibly locates the girdle member at the exact cord centerline diameter that is designed for the finished tire. The tension on the girdle member cords is also maintained. The hoop assembly-core member assembly is then placed in a conventional casting mold for the manufacture of tires, the mold is filled with a viscoelastic material and the material is cured to form the finished pneumatic tire.

The tire made by the method of this invention with the girdle member located in the crown area of the tire below the road-engaging tread surface may be comprised entirely of a high modulus viscoelastic material wherein the bead areas, sidewalls, crown area beneath the tread and the road-engaging tread surface are a viscoelastic material. Alternatively, the tire manufactured by the method of this invention may have a conventional rubber, road-engaging tread with the girdle member located in the crown area of the cast body radially below the tread. Such a tire would comprise the conventional rubber tread and a cast body which would extend from one bead to the other and encompass the sidewalls and crown area of the tire radially inward of the road-engaging, conventional rubber, tread surface.

The girdle member may be embedded in the viscoelastic material of the cast body or it may be located at the junction of the crown area of the cast body and the conventional rubber tread, when such a tread is used. The girdle member may be embedded in a conventional rubber skim compound when it is located at either of the above positions.

When used, the carbon black reinforced, conventional rubber tread may be any of the standard tire treads utilized in the industry and known in the art. Such rubber treads comprise natural or synthetic rubber or blends thereof, are reinforced with various types of carbon black, most commonly furnace blacks, and contain other ingredients, such as processing and extender oils, preservatives (antioxidants, antiozonants and waxes) and vulcanized ingredients (accelerators and sulfur). The exact composition of the rubber tread is not a part of this invention and any standard rubber tread compound commonly used as such may be employed. Preferably, however, the tread should have a Durometer hardness of between 55 and 65, preferably 60.

The material utilized in the cast body and the cast tread, when one is present, may be any of the known high modulus viscoelastic materials that have been recommended for use in a cast tire having no cord reinforcing members in the body as long as the material meets the physical limitations set out below. The limitations are critical to attain the proper balance between the composition of the cast body and the girdle member.

Preferably, the viscoelastic material should have a tensile strength of 212° F. equal to or greater than 1,800 psi, a crescent tear strength at 212° equal to or greater than 200 psi, a De Mattia flex life at 176° F. equal to or greater than 200,000 cycles; and at ambient temperature, a tensile strength equal to or greater than 2,800 psi, an elongation equal to or greater than 400%, a Young's modulus of between 5,000 and 15,000 psi and a Poisson's ration of about 0.5, or less, preferably between 0.4 and 0.5.

Polyurethane rubbers, particularly of the type disclosed in U.S. Pat. No. Re. 28,424 and U.S. Pat. No. 4,006,767 are particularly useful as the material in the body of the tire of this invention. This rubber should have a molecular weight of 800 to 5,000 between the electrostatic cross-links and a molecular weight of 5,100 to 40,000 between the covalent cross-links and a Poisson's ratio of 0.48.

It is understood that the viscoelastic properties of the body material should not permit excessive creep which results in dimensional instability. Creep is an increase in elongation of the material as a function of time for a given load. The creep of the material is correlated to the reduction of the stress with time at a constant elongation. A material which has an excessive reduction of the stress with time is found to exhibit unacceptable dimensional stability or growth in service over a period of time.

The polyurethane elastomer as described above will exhibit acceptable creep during the normal service life of the tire. Materials which exhibit creep significantly greater than that of the described material would be expected to have unacceptable growth if used for a cast tire body.

The viscoelastic material may be uniform in physical properties throughout the tire or it may vary depending on its location in the tire. For example, when it varies, the material used for the tread will be designed for wearing and traction properties, the sidewalls for flexing and dimensional stability and the bead area for adhesion to the bead wire. These differences are obtained by charging different materials into the tire mold at different times and locations.

The bead member in the bead area of the tire may be any of the standard bead construction normally used, and known in the art, for pneumatic tires. Such bead constructions may comprise layer beads or cable beads and may be manufactured from strands of inextensible materials, such as steel, glass or aramid. The structure of the beads and the strength of the beads is dictated by the strength required to retain the tire on the rim.

The carbon black-reinforced rubber skim compound that the girdle member may be embedded in may be any of the known rubber skim compounds that are normally used in the art with the cord material that is utilized in the girdle member. Such compounds normally contain natural rubber or blends of natural rubber with various synthetic rubbers, carbon black or other reinforcing agents, processing or extender oils, preservatives, such as antiozonants, and vulcanizing agents, such as accelerators and sulfur.

The adhesive that may be utilized at the interface of the rubber tread and the cast body is specifically designed to provide adhesion between the dissimilar materials; that is, the rubber tread compound and the polyurethane cast body. Examples of adhesives of this type are described in U.S. Pat. Nos. 3,880,810; 3,880,808; 3,916,072 and 3,925,590.

The girdle member used in the tire that is manufactured as a result of a method of this invention may be constructed of a single cord that is spiral wrapped around the outer periphery of the annular member.

When the girdle member is formed by the spiral wrapping techniques, preferably it will comprise a series of parallel cords that have an angle which is parallel, or approximately parallel, to the circumferential centerline of the finished tire. In other words, the cords will be substantially circumferential of the tire. It is understood that the cords could also be angulated in relation to the circumferential centerline by this technique.

If the cords are applied as a separate ply layers, the cords within each ply layer will be parallel to each other and may have any of the known angulations for reinforcing belts. The angle from ply to ply may vary or be the same or be oppositely directed.

Preferably, the girdle member in the method of this invention is formed by adjacent parallel cords that are essentially parallel to the circumferential centerline of the tire. These adjacent, parallel cords are formed by either a preassembled ply of paralled cords being located in the tire such that the cords are parallel to the circumferential centerline of the tire or, preferably, circumferentially or spirally wrapping a single cord on a core to form the member. With this spiral wrapping construction there is no splice in the cord layer but merely two single cord ends, one at the beginning of the spiral wrap operation and the other at the end. The girdle member is preferably a single ply but two or more plies may be used, if desired.

The material used for the reinforcing cord in the girdle member may be any of the known reinforcing materials used in pneumatic tires. Examples of these materials are aramid, polyesters, steel, glass, rayon, polyvinyl alcohol or nylon. The last material is the least acceptable due to its inherent growth characteristics, whereas the relatively inextensible materials (aramid, steel and glass) are the preferred materials due to their inextensible nature.

An important feature of the girdle member in the method of this invention is its ability to have a predetermined uniform tension applied to its cords and the maintenance of the uniform tension into the final product. This is possible by this method in that the cords are applied to an annular member under a predetermined tension and stabilized in the hoop assembly at this predetermined tension. This uniform tension is mechanically maintained on the cords on the annular member until the hoop assembly is formed by the injection and curing of the viscoelastic material. The annular member is sufficiently rigid to withstand the tension forces applied to the cords and to maintain the tension on the cords. The viscoelastic material is cured to a sufficient extent to maintain the dimensional integrity of the hoop assembly and to hold to tension on the cords. This uniform tension is maintained throughout the remaining steps of inverting the hoop assembly, mounting it on the core member, injecting the tire viscoelastic material and curing the tire. This tension may vary depending upon the type cords that are used in the girdle member, but the tension is uniform from cord to cord in the girdle member.

Another important feature of the method of this invention is its capability to permit a predetermined radius of curvature to be accurately, reproducibly present in the girdle member. Normally, the finished tire tread radius would be between 10 inches and infinity (flat). The radius of curvature of the girdle member may also be within this range.

The radius of curvature of the girdle member is attained by the outer periphery of the annular member on which the girdle member is assembled having a radius of curvature. This annular member radius yields an identical radius in the girdle member in the hoop assembly. If the outer periphery of the annular member is flat, the girdle member will be flat (radius of infinity); if its 10 inches, the girdle member will be 10 inches.

The inversion of the hoop assembly will not alter the radius of the girdle member. Each cord diameter is fixed in the hoop assembly and the inversion doesn't alter it. This means if the girdle member is concave radially inward in the first mold; it will remain so after removal and inversion.

It is understood that the surface of the outer periphery of the annular member upon which the girdle member is assembled may contain notches to receive the cords when the radius of curvature is low. These notches hold the cords in proper position until the viscoelastic material is applied and cured.

The structural relationships of the periphery of the spacing support member and the outer periphery of the annular core member in the second molding (tire molding) step may be varied to cooperate with each other to yield the proper location and radius in the girdle member in the finished tire. That is, the outer periphery of the annular core member may be flat, concave or convex so long as inner periphery of the inverted spacing support member is compatible therewith to yield the proper girdle member location. Likewise, the inner periphery of the inverted spacing support member may be flat, concave or convex (it is understood that the molding of the non-inverted spacing support member may be designed to yield these conditions in the inverted structure) in order to be compatible with the outer periphery of the annular core member in the second molding step to yield the proper location of the girdle member in the finished tire.

The spacing support member may be any mechanical structure that will permit the hoop assembly to be inverted or turned inside out which has a predetermined height to accurately locate the girdle member at the desired location in the finished tire. The diameter of the spacing support member is decreased by the inversion of the hoop assembly so that excessive compression forces could exist in the spacing support member depending upon its required height or thickness. If the height of the spacing support member is not too great, it may be a solid sheet with a smooth surface without creating excessive compression forces on inversion. If the heighth is too great and undesired, excessive compression forces would result in the spacing member support when the hoop assembly is inverted, the spacing support member may be comprised of an interrupted surface in the form of protruding pins, lateral bars, angulated bars, and other structural equivalence, to release the compression forces. If the spacing support member has some type of interruption (a series of pins or bars), the gaps between the pins or bars will be filled with the viscoelastic material during the final molding operation for the finished tire.

In the preferred method of this invention the finished tire contains a conventional rubber tread. The preferred method comprises the forming of the girdle member by spiral wrapping at a predetermined uniform tension one continuous cord onto an annular member which is the core mold member for the first mold and the assembly of the hoop. The outer periphery of the annular core has a radius of curvature of infinity (flat) which yields a radius of curvature of infinity in the girdle member. This is identical to the designed radius of curvature of the tread in the tire as molded. The girdle member-annular core is then placed in the remainder of the mold for forming the hoop assembly. The remainder of the mold has a means for forming the spacing support member radially outward from the newly formed girdle member. The cord centerline diameter that is attained as a result of the application of the girdle cord to this annular mold cord is the desired cord centerline diameter in the finished tire.

The viscoelastic material is then injected into the mold and, in the case of a polyurethane as described previously, is cured at a temperature of 100°–130° C. for a sufficient time so that it will attain dimensional stability (usually from 5 to 60 minutes). The mold is then opened and the resulting annular hoop assembly of polyurethane material, spacing support member and the girdle member is removed. In this assembly the girdle member is located on the inner periphery and the spacing support member on the outer periphery.

This hoop assembly is then inverted or turned inside out so that the girdle member is located on the outer periphery and the spacing support member on the inner periphery. In this condition, the hoop assembly is placed into a tire mold onto the outer periphery of its annular core member. In this manner the spacing support member rests on the core and the girdle member is fixed in its proper location in relation to the finished tire structure. A precured conventional rubber tread is placed in the tread portion of the mold and an adhesive is applied to its inner periphery. The mold is then closed and polyurethane is injected into the mold in the tire sidewalls. The polyurethane is then cured at 100°–130° C. for from 5 to 60 minutes, depending upon the specific composition of the material. After this curing cycle, the mold is opened and the finished tire is removed.

The polyurethane in the second molding operation (tire) may contain a wetting agent to assist in the bond between it and the polyurethane that is employed during the first molding (hoop assembly molding) operation. Aliphatic perfluorocarbon esters, such as one marketed under the Trademark "Fluorad FC 430", have been found useful as such wetting agents.

The known methods of molding a cast tire may be used in the final curing operation. Such known methods are centrifugal molding wherein the mold is rotated, or static liquid injection methods such as reaction injection molding (known in the art as RIM) or liquid injection molding (known in the art as LIM).

DETAILED DESCRIPTION OF THE INVENTION

FIG. 3 is a cross-sectional view of a tire manufactured by the method of this invention with a conventional rubber, road-engaging tread and the girdle member totally embedded in the cast body.

FIGS. 4 through 8 represent different steps in the method of manufacture of this invention. FIG. 4 depicts a partial cross-sectional view of the annular member for forming the girdle member with the girdle member placed thereon. FIG. 5 depicts a partial cross-sectional view of the hoop assembly mold with the girdle member therein. FIG. 6 depicts a partial lateral cross-sectional view of the finished hoop assembly. FIG. 7 is a partial lateral cross-sectional view of the hoop assembly after inversion. FIG. 8 is a partial cross-sectional view of the tire mold with the inverted hoop assembly placed therein.

Figure 1:
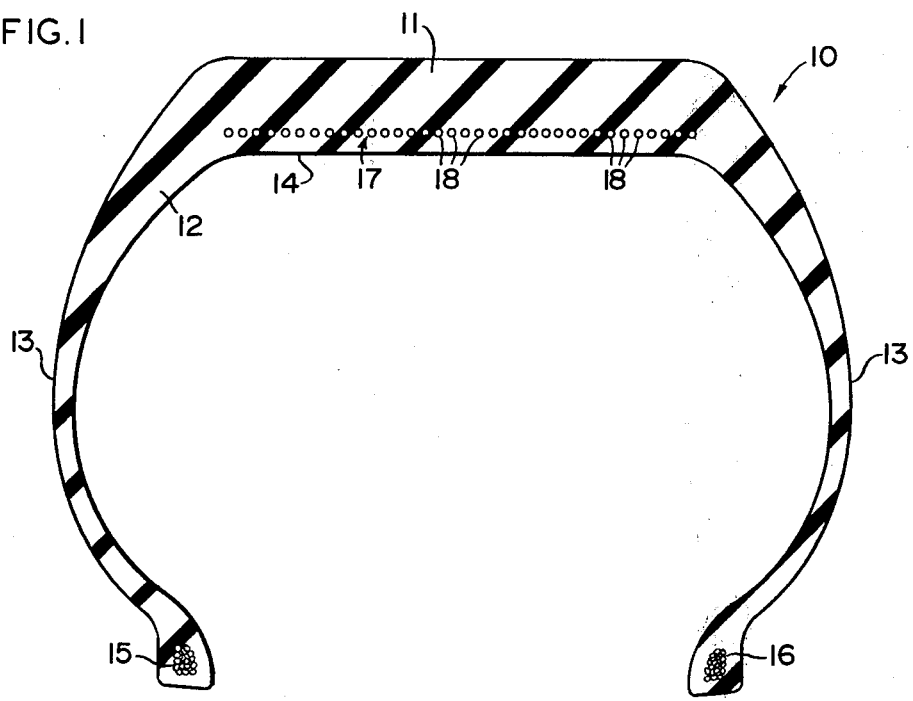
FIG. 1 is a cross-sectional view of a tire manufactured by the method of this invention with the girdle member totally embedded in the cast body and the road-engaging tread surface is viscoelastic material.

FIG. 1 shows the tire generally as 10 with a ground-engaging tread, 11, body 12, and annular beads, 15 and 16. The body, 12, extends continuously from bead 15 to bead 16 encompassing sidewalls, 13, and connecting body crown portion, 14, which is located in the crown area of the tire radially beneath the road-engaging tread, 11. The road-engaging tread is shown as the same cast material that is used to manufacture the body.

In FIG. 1 the girdle member, 17, is comprised of reinforcing cords, 18, which are embedded in the connecting crown portion, 14, of the body, 12.

Figure 2:
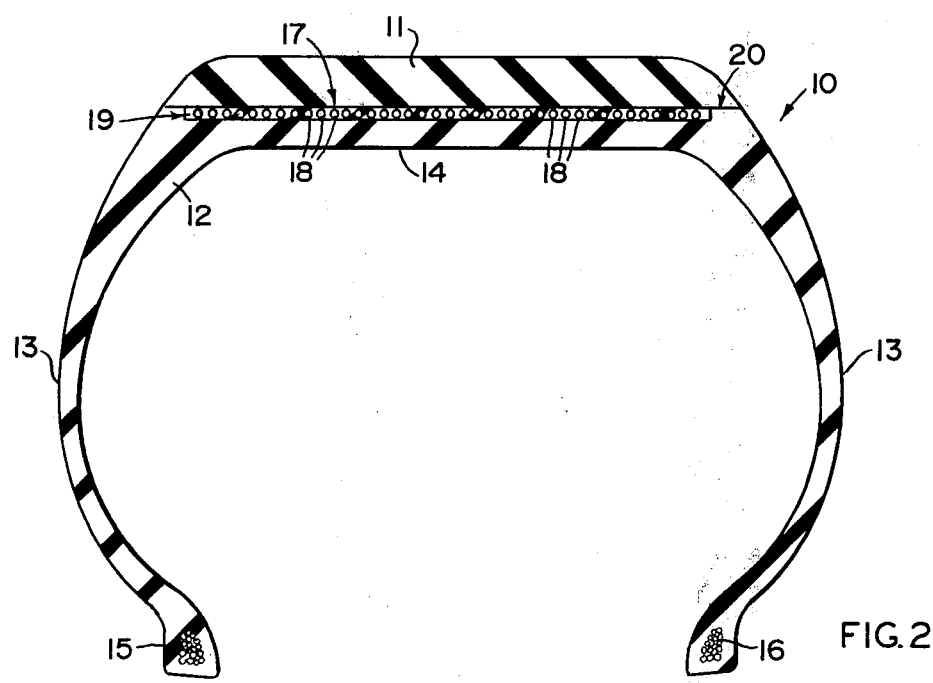
FIG. 2 is a cross-sectional view of a tire manufactured by the method of this invention with a conventional rubber tread with the girdle member embedded in a rubber skim compound and located at the junction of the cast body and the conventional rubber, road-engaging tread.

In FIG. 2 the structural parts that are identified in FIG. 1 are identified by the same references in FIG. 2. FIG. 2 differs in that the road-engaging tread, 11, is shown as a material, a conventional rubber tread, different than the body, 12. The junction between the tread and the body is shown at the interface, 20. Also, in this embodiment the girdle member, 17, is shown as comprising parallel reinforcing cords, 18, that are embedded in a rubber skim, 19. An adhesive may also be provided at the interface, 20, of the conventional rubber tread, 11, rubber skim, 19, and the body, 12.

In FIG. 3 the structural parts that are identified in FIGS. 1 and 2 are identified by the same reference numbers in FIG. 3. FIG. 3 differs from FIG. 1 in that the road-engaging tread, 11, is a material different than the body 12; it is a conventional rubber tread as shown in FIG. 2. As in FIG. 1 the girdle member, 17, is totally embedded in the crown portion of the body, 14. It is located in FIG. 3 at a position beneath the junction of the tread and the body.

FIGS. 4 through 8 depict the method of this invention at its various stages. FIG. 4 is a partial, cross-sectional view of the annular member for forming the girdle member which is also the core for the first mold. This annular member is comprised of an annular piece, 30 with a predetermined annular outer periphery, 31. This annular outer periphery is dimensioned so that the reinforcing cords, 18, of the girdle member, 17, have a cord centerline diameter that is the desired cord centerline diameter in the finished tire.

In FIG. 4 the radius of curvature of the outer periphery, 31, of the annular member, 30, is shown as R. In FIG. 4 the radius is infinity (flat). This yields a girdle member with the same radius (infinity) as shown in FIGS. 4–8. It is understood that the outer periphery, 31, may be varied to any desired radius depending upon the design required in the finished tire. The outer periphery, 31, may be concave or convex. Such outer periphery configurations will yield girdle members with identical configuration throughtout the method of this invention and in the final product.

In FIG. 4 the girdle member, 17, is obtained by spiral wrapping a cord, 18, in successive parallel turns around the outer periphery, 31, of the annular member, 30, at a specified uniform tension. It is also understood that one or more layers of the cords may be used in the girdle member.

FIG. 5 depicts the first molding step wherein the annular member, 30, with its companion girdle member, 17, mounted thereon, is placed into the remaining portions, 40, of the first mold. The inner periphery, 41, of the first mold forms the cavity that defines the spacing support member. The inner periphery, 41, of the mold portions, 40, may be smooth or it may be provided with interruptions, 42, which form an irregularity in the outer periphery of the molded hoop assembly (see FIG. 6). In the method of this invention, a viscoelastic material is injected into the mold cavity formed by mold members 40 and 30 through an aperture, 43. After the viscoelastic material has been cured to a sufficient extend to maintain its dimensional stability and hold the cords in tension, the mold is opened and the hoop assembly (50, in FIG. 6) removed. The hoop assembly is an annular piece with the girdle member, 17, on its inner periphery and the spacing support member, 51, on its outer periphery.

FIG. 6 is a partial sectional view of a portion of the hoop assembly, 50, taken at the line A—A in FIG. 5 looking in the direction of the arrows. In FIG. 6 the girdle member reinforcing cords, 18, are shown on the inner periphery of the hoop assembly and the spacing support member, 51, is shown on the outer periphery. In this embodiment the spacing support member is a series of lateral ridges. It is understood that the spacing support member may have any mechanical structure that permits the inversion of the hoop assembly and has the appropriate height dimension from the girdle member to the outer periphery of the spacing support member.

FIG. 7 is a partial sectional view of the hoop assembly of FIG. 6 after it has been inverted or turned inside out. FIG. 7 shows a partial sectional view of the inverted hoop assembly, 50, as it would appear in the final tire molding step which is depicted in FIG. 8. FIG. 7 represents the view of the lateral partial cross-section of the hoop assembly at line B—B looking the direction of the arrows in FIG. 8.

In FIG. 7 the inversion of the hoop assembly has placed the girdle member, 17, on the outer periphery and the spacing support member, 51, on the inner periphery. This inversion will not alter the cord diameter of the girdle member, the tension on the girdle member cords and the radius of curvature of the girdle member.

FIG. 8 is a partial sectional view of the tire mold used in the last step of the method of this invention with the girdle member mounted in the mold. The hoop assembly, 50, is shown in its inverted positon, as depicted in FIG. 7, with the girdle member cords, 18, located on the outer periphery and the spacing support member, 51, located on the inner periphery and resting upon the annular core mold member, 60.

In the method of this invention the inverted hoop assembly of FIG. 7 is placed upon the outer periphery of the annular core of the mold, 60, with the spacing support member, 51, of the hoop assembly resting on the outer periphery of the mold. The height of the spacing support member is designed to accurately and reproducibly locate the girdle member in the desired location of the finished tire. The annular core member with the girdle member mounted thereon is then placed inside the tire mold, 61, a viscoelastic material is injected into the mold and is cured by standard, known methods.

As previously stated the radius of curvature of the outer periphery of core, 60, may be varied to cooperate with the spacing support member to yield the designed radius of curvature in the girdle member. In accomplishing this the core radius may be infinity (flat) or of any other length so long as it is coordinated with the radius of the spacing support member to yield to designed radius in the girdle member.

If a tread of a viscoelastic material is used, the tire may be formed by standard techniques. If a conventional rubber tread is used in the method of this invention, the conventional rubber tread is precured in a separate, known step. This precured tread strip is then placed in the tire mold in the tread ring area. An adhesive, as described earlier, is preferably applied to the inner periphery of the tread. The annular core-hoop assembly is then placed in the mold and the injection and curing steps are followed to complete the manufacture of the tire.

The cord angle of the reinforcing cords in the girdle member may be substantially 0°; that is, parallel to the circumferential tread centerline of the tire or of any angulation restrictive in the hoop direction.

The method of this invention has been successfully employed to manufacture suitable tires. Such tires had a cast body, a conventional rubber tread, and the girdle member was embedded entirely in the cast body. The tire was an A78-13 size. The compositions of the body, rubber tread, adhesive, girdle member and bead members is as follows.

The rubber tread comprised a solution styrene/butadiene copolymer with the standard compounding ingredients, such as reinforcing carbon black, sulfur, accelerators and the like, as is well known in the art. The physical properties of the rubber tread in this specific tire were a tensile strength of about 2500 psi, a Shore A durometer hardness of about 59, a modulus of about 950 psi at 300% elongation, and elongation at break of about 600% and a hysteresis value of 40% as measured on a ball rebound test at room temperature.

The entire tire body, including spacing support member, was comprised of a polyurethane polymer. At 212° F. its tensile strength was 2560 psi and its cresent tear strength was 345 psi. At ambient temperature its tensile strength was 4900 psi, its elongation as 550% at break and its Young's modulus was 9,600 psi. Its Poisson's ratio was 0.48.

The adhesive at the interface of the body and tread was spcifically designed to promote adhesion between a polyurethane member and a rubber member. The particular adhesives employed were similar to one described in U.S. Pat. Nos. 3,880,810; 3,880,808; 3,916,072 and 3,925,590.

The girdle member comprised an aramid cord as the reinforcing cord. The girdle member was obtained by spiral wrapping a continuous cord of aramid around a core. The radius of curvature of the core was infinity (flat) so the girdle member had a flat radius of curvature. The tension on the cord in the girdle member was between 10 to 20 pounds.

The aramid cord in the girdle member had 10 parallel cords per inch (ends per inch), all parallel to the circumferential centerline of the tire tread. The girdle member had a width of 2.5 inches. The aramid fiber used had a 1500/3 construction and a tensile strength of 165 pounds minimum and an ultimate elongation of 5 to 7%. The girdle member had a Poisson's ratio of 0.50 and a modulus of 155,000 psi.

The bead members comprised a cable bead construction as is well known in the art. This particular construction comprised a cable of one strand wrapped by eight.

In this embodiment wherein the girdle member is entirely embedded in the cast body, after being inflated on a standard 13 inch diameter rim with a 4.5 inch rim width for a period of 24 hours at 24 psi, the tire had a circumference of 73.88 inches, a section width of 6.5 inches and a tread radius of 14 inches. The tire so described was tested on a 67-inch diameter indoor test wheel under standard conditions for the U.S. Department of Transportation Endurance Test as defined in Federal Motor Vehicle Standard 109. Under the conditions of this test tires are run at a constant speed, 50 mph, at rated inflation, 24 psi. The load was increased during the test cycle. In the first four hours it was 100% of rated load of the tire, the next six hours it was 108% and the last 24 hours it was 115%. The test was completed after these cycles with the tire running a total of 1,700 miles. The tire of this invention completed the test with no failures, thereby qualifying as passing this test.

The Table below sets out the tire measurements taken on the tires during this test with zero miles and hours being the initial measurement before the test was started. These figures indicate very little growth during service and are well within the Tire & Rim Association specifications for tire growth.

TABLE

| Department of Transportation Endurance Test (FMVSS 109) | | | |
|---|---|---|---|
| Hours | 0 | 4 hours | 34 hours |
| Circumference in center (in.) | 73.88 | 74.4 | 74.5 |
| Radius (in.) | 14 | 15.5 | 15.5 |
| Section Width (in.) | 6.5 | 6.78 | 6.80 |

The tire manufactured by the method was also tested on the U.S. Department of Transportation (DOT) High Speed Test as defined in Federal Motor Vehicle Safety Standard 109. Under the conditions of this test tires are run at a constant load (100% of rated load) and a constant inflation pressure (30 psi). The speed of this test is variable comprising a break-in period of 2 hours at 50 mph and then ½ hour running time at 5 mile increments beginning at 75 mph. The tire of this invention completed 0.4 hours at the 110 mph step and was removed due to a tread chunk out. The tire significantly exceeded the accepted Government high speed standard for this test.

I claim:

1. In the method of manufacturing a pneumatic tire comprising an annular road-engaging tread in the crown area, sidewalls connecting the lateral edges of said tread to annular beads, a cast body extending continuously from one bead to the other encompassing the sidewalls and the crown area radially inward of said tread, and a girdle member comprised of reinforcing cords embedded in said crown area of said cast body, the improvement comprising the steps of assembling the girdle member directly on the outer periphery of a rigid annular member with said cords having a cord centerline diameter substantially equal to the one desired in the finished tire, placing said annular member-girdle member assembly into a first mold with means to form a spacing support member on the outer periphery of said girdle member, injecting a viscoelastic material into said mold, curing said viscoelastic material to form a hoop assembly having the girdle member on its inner periphery and the spacing support member on its outer periphery, removing said hoop assembly from said mold, inverting said hoop assembly while maintaining the desired cord centerline diameter of girdle member cords whereby said girdle member is on the outer periphery and said spacing support member is on the inner periphery, placing said inverted hoop assembly in a tire mold with said spacing support member supported by the outer periphery of an annular core mold member and said girdle member cords at the desired cord centerline diameter, filling said tire mold with a viscoelastic material to form a tire and curing said viscoelastic material to form a pneumatic tire.

2. The method of claim 1 wherein said girdle member is formed by spiral wrapping a single cord on said annular member.

3. The method of claim 1 wherein said girdle member is formed by wrapping at least two plies of angulated cords restrictive in the hoop direction, on said annular member.

4. In the method of claim 1 wherein said tread is a conventional, carbon black reinforced, rubber including the additional steps of placing a precured, conventional rubber tread in the tread area of the tire mold prior to the injection of said viscoelastic material into said mold.

5. In the method of the claim 4, the additional step of applying an adhesive to the inner periphery of said precured, conventional rubber tread in said tire mold prior to the injection of said viscoelastic material so that said adhesive is located at the interface between said crown area of said cast body and said tread.

6. The method of claim 1 including the additional step of embedding said girdle member in a carbon black reinforced, conventional rubber skim compound prior to assembling said girdle member on said annular member.

7. The method of claim 1 wherein said girdle member is comprised of one or more plies of reinforcing cord formed by a single spiral wound cord which has an angle of approximately 0° in relation to the circumferential centerline of the tread.

8. In the method of claim 1, the additional step of providing said spacing support member with interruptions on its outer periphery during the first molding step.

9. In the method of claim 1, the additional steps of providing said girdle member with a predetermined radius of curvature by varying the outer periphery of said annular member.

10. In the method of claim 1, the additional step of applying a predetermined, uniform tension to said reinforcing cords of said girdle member during the assembling of said girdle member on said annular member.

* * * * *